Feb. 10, 1959  J. R. SMITH ET AL  2,872,861
FORMING OR MOLDING APPARATUS
Filed Jan. 31, 1955  2 Sheets-Sheet 1
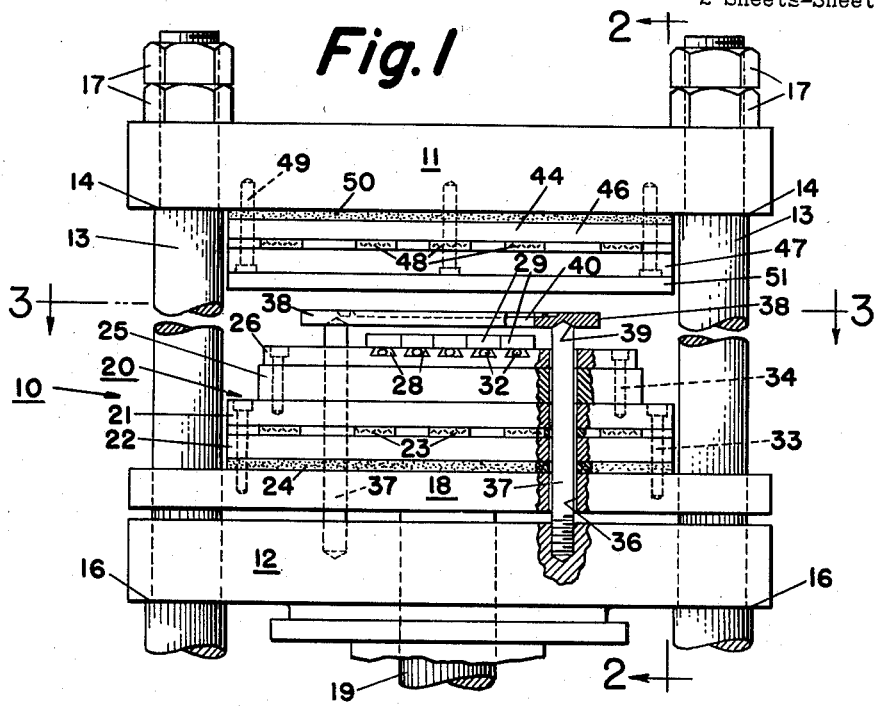
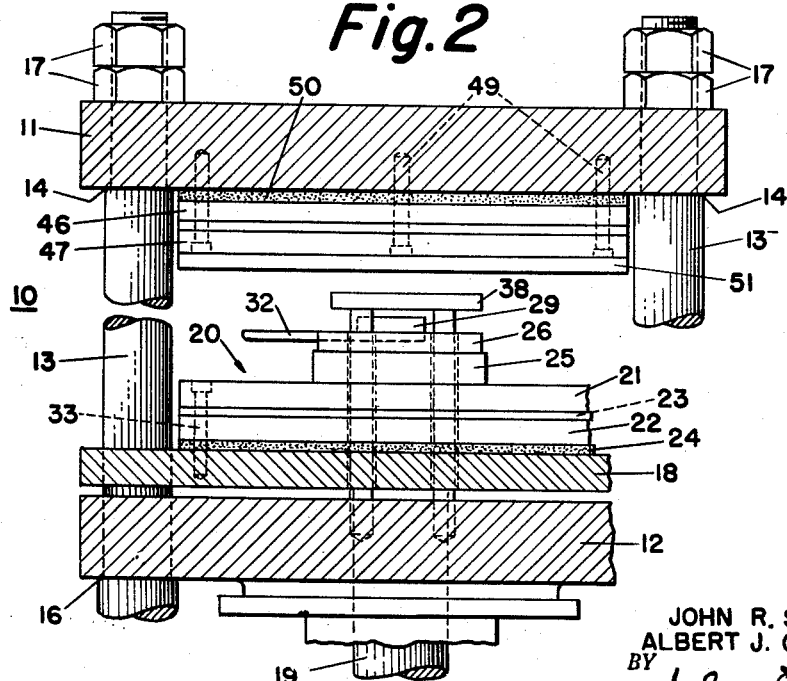
INVENTOR.
JOHN R. SMITH
ALBERT J. CIZAUSKAS
BY
John D. Myers
ATTORNEY

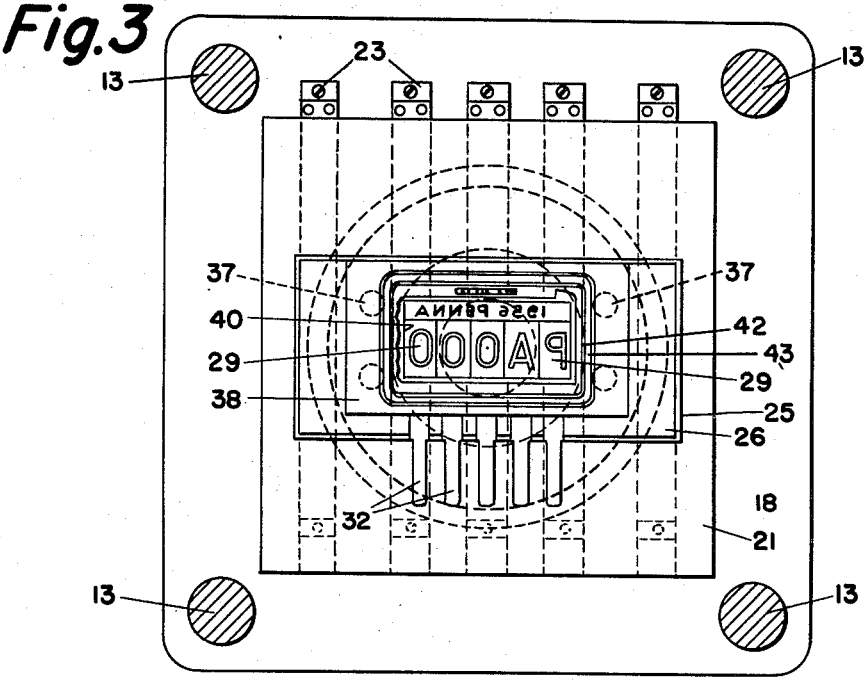
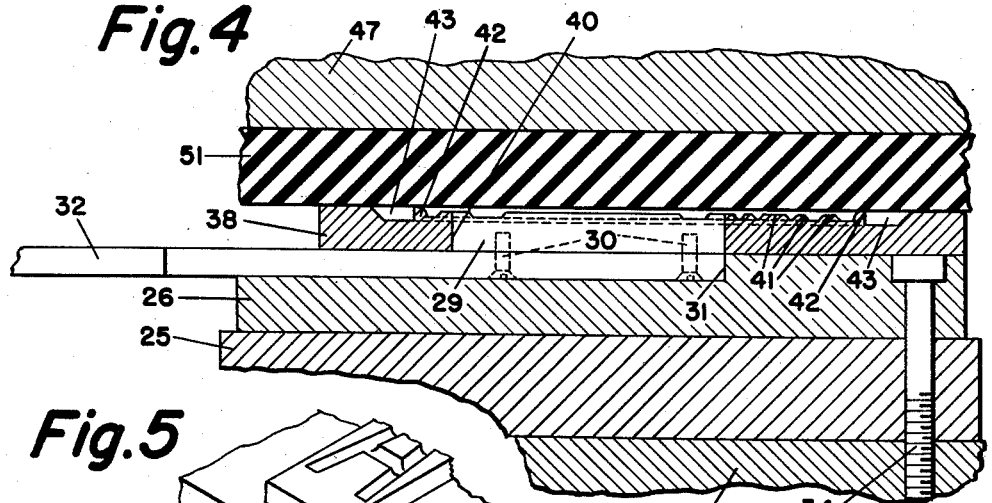
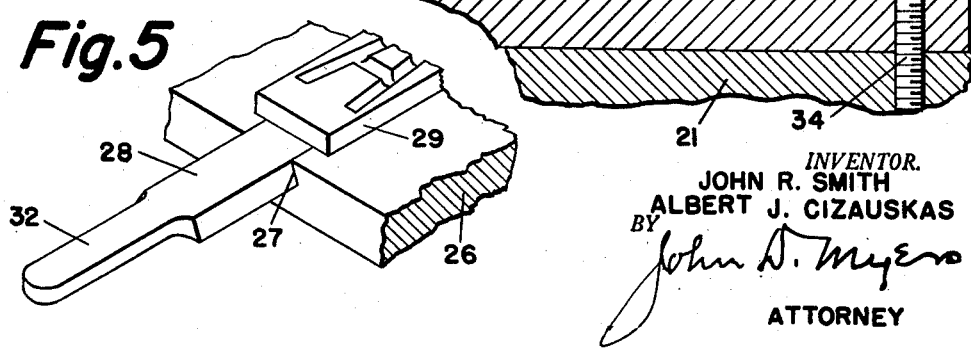

2,872,861

FORMING OR MOLDING APPARATUS

John R. Smith and Albert J. Cizauskas, Pittsburgh, Pa., assignors to the Commonwealth of Pennsylvania Application January 31, 1955, Serial No. 484,986

8 Claims. (Cl. 101—27)

This invention relates generally to forming or molding apparatus and is particularly concerned with apparatus for serially fabricating relatively thin products, wherein the members of the series resemble each other in general aspect while differing from one another in the character and/or position of markings or indicia produced in relief or intaglio on their surfaces. The invention therefore is particularly applicable to the fabrication of license plates for motor vehicles, although it will be understood to have utility in the manufacture of other products, such as highway markers, traffic signs, etc., for which it is desirable to maintain a uniform general appearance but wherein the information or message conveyed necessarily differs with the intended purpose of the completed plate or sign.

Automobile license plates in most States are fabricated from sheet metal, and in their production it has been the practice to use two punch presses in succession, one of the presses being provided with the dies for forming the characters common to the entire series (such as the name of the State issuing the license plate, and the year of issue), and the other punch press having the interchangeable dies for forming the numerals and letters comprising the identifying license number. Thus, in the usual procedure for producing such license plates according to the prior art, sheet metal is first cut into rectangles of the proper size, and the precut sheets are subjected to the following sequence of forming and finishing operations: formation of the license number by interchangeable dies contained in one of the presses; formation of the remaining information characters (common to all license plates of the series) by a suitable die in the other press; painting the product of the second press with the appropriate background color; and painting the license number and other raised portions with the necessary contrasting color.

We have found that a considerable saving in labor and equipment costs may be realized over the aforementioned prior art procedure by fabricating the license plates in a mold or die comprising a pair of mating parts relatively movable into and out of forming engagement, wherein one of the die parts is of composite construction and contains the character-forming indicia for producing the desired marking on the license plates, and the other die part comprises a resilient rubber or rubber-like pad by which pressure is applied for forming and trimming the product. In the preferred construction, the composite mold or die part is composed of a pair of mold or die members movable into and out of telescoped or nesting relation with one another, one of such members being provided with permanently formed indicia for producing the markings common to all license plates of the series, and the other of such members carrying removable and interchangeable character-forming indicia by means of which the license number may be progressively changed, as required, as the series of formed products progresses.

By means of apparatus so constructed, products such as license plates may be fabricated in one operation, in a single press, thereby effecting a saving in the time, labor and equipment costs incidental to the operation of the additional press required by the aforementioned prior art procedure. Moreover, apparatus constructed and operable in the preferred manner just described, may be advantageously employed in fabricating molded plastic products, and when the plastic material employed contains the proper pigment for the desired background color, a license plate (for example) may be formed in one operation, in a single press, requiring for its completion only the additional step of applying the contrasting color to its raised areas.

An object of the invention therefore is to provide apparatus for forming, in a single operation, automobile license plates or other products of similar nature which are produced in large numbers, having means for quickly and easily changing certain indicia therein whereby the products formed in a series may be given individual characteristics while maintaining uniform over-all appearance.

Another object is to provide apparatus of the type referred to in the foregoing object including a composite mold or die member, one part of which is provided with permanent forming characters responsible for the uniform general appearance of the products formed thereby, and the other part of which includes removable and interchangeable mold or die characters which impart the individual markings in the products by which the latter may be distinguished from one another.

A further object is to provide forming or molding apparatus including a pair of mating die or mold parts mounted in a press of conventional design, one of the parts of the mold or die being of composite construction and including cooperating portions alternately assembled and separated, into and out of cooperating relation, by normal operation of the press, and one of the cooperating portions including character-forming indicia which may be easily and conveniently removed and interchanged when the said portions are not in cooperating relation.

With these and other objects in view, the invention consists in the construction and novel combination of parts fully described hereinafter, illustrated in the accompanying drawings, and defined in the claims appended hereto, it being understood that various changes in form and construction may be resorted to without departing from the spirit of the invention.

In the drawings,

Fig. 1 is a front elevation, partly in section, of apparatus constructed in accordance with the present invention;

Fig. 2 is a vertical section taken on the line 2—2 of Fig. 1;

Fig. 3 is a horizontal section taken on the line 3—3 of Fig. 1;

Fig. 4 is a vertical section illustrating the die parts of the apparatus in cooperating engagement; and Fig. 5 is a perspective view of a portion of one of the die members.

In the drawings, there is illustrated apparatus especially adapted for the manufacture of automobile license plates, the apparatus including a conventional press 10 comprising a head 11 and a bed 12, supported by a plurality of upright standards 13 secured at their lower ends to a suitable foundation (not shown). The head 11 and bed 12 are suitably apertured adjacent their corners to allow the upright standards 13 to pass therethrough, and the standards are provided with longitudinally spaced annular shoulders 14 and 16 for supporting the head and bed permanently in vertically spaced parallel relation, as shown. The tops of the upright standards 13 are threaded for the reception of nuts 17, whereby the head 11 is prevented from longitudinal displacement relative to the standards.

The press 10 also includes a platen 18 secured to the upper end of a ram 19 movable vertically by hydraulic or other means (not shown). The standards 13 slidably pass through suitable apertures in the corners of the platen 18 thereby guiding and stabilizing the platen in its normal vertical movement toward and away from the head of the press. The platen 18 carries on its upper face a heater, indicated generally as 20, which may be of any conventional construction and, as shown, consists of a pair of plates 21, 22 separated by electric heating elements 23. An asbestos pad 24, or other insulating material, is disposed between the plate 22 and the platen 18.

Supported by the heater 20 is a base plate 25 which in turn carries a die-holding plate 26, the latter being provided on its upper surface with mortised undercut guides or keyways 27 (Fig. 5) for the reception of slides 28 to which raised die portions 29 are secured, as by screws 30. The die portions are provided with the character-forming indicia, either in intaglio or relief, desired to be formed on the product. The keyways 27 do not extend entirely across the die-holding plate 26, but terminate in each instance at a wall or abutment 31 (one of which is shown in Fig. 4) at an intermediate point across the width of the plate, against which the slides 28 abut and are thus properly aligned and positioned to cooperate with another mold or die member presently to be described. Handles 32 are formed in the outer ends of the slides 28 which project from the die-holding plate 26, providing ready means for removing and interchanging the slides in the several keyways.

The heater 20 is secured to the platen 18, as by cap screws 33, and the base plate 25 and die-holding plate 26 are in turn secured to the heater 20, as by cap screws 34, and the unitary structure so formed is suitably bored, as shown at 36, to permit loose passage therethrough of pins 37 which are threadedly or otherwise fixed to the bed 12. Preferably, four pins 37 are employed, rectangularly spaced, and the upper ends thereof, which are preferably conical as shown, extend above the die-holding plate 26 when the platen 18 is fully retracted from the head 11 (Figs. 1 and 2).

A mold or die member 38, here shown in the form of an embossed plate, freely rests on the tops of pins 37 when the platen 18 is in the fully retracted position, the member 38 being provided in its under side with conical depressions 39 at positions corresponding to the positions of the pins 37, whereby the member 38 is properly positioned for coaction with the dies 29, as will appear hereinafter.

Consonant with the objects of the invention, the mold or die member 38 is cut away or apertured, as at 40, for the reception of the interchangeable character-forming indicia carried by the slides 28, and is embossed or otherwise provided with the permanent character-forming indicia in the peripheral area surrounding the aperture to impart to the products formed therein the characteristics responsible for their uniform over-all appearance. For example, in the illustrated apparatus for forming license plates the upper surface of the die member 38 surrounding the aperture 40 may be provided with embossing 41 in the outline of the state issuing the license, and may include information such as the name of the state, the year of issue and expiration date of the license.

Surrounding the whole of the embossed area is a trimming edge 42 which determines the outline or marginal form of the product, and surrounding the edge 42 is an overflow well 43 for receiving surplus stock or molding material overlying the trimming edge. The trimming edge 42 preferably extends a short distance above the embossed characters 41 in order to assure that the finished license plate will have the desired thickness when a plastic material is used in its fabrication.

The keyways 27 in the die-holding plate 26 are so positioned that when slides 28 are placed therein to the limit provided by abutments 31 the raised dies 29 on the slides are located directly beneath the aperture 40, and the raised dies 29 are so proportioned that their sides abut snugly against one another and, collectively, telescope or nest within the aperture 40 when the die-holding plate 26 is raised into cooperating engagement with the die member 38.

A heater 44, which may comprise a pair of plates 46, 47 separated by a plurality of electric heating elements 48, is secured to the under side of the head 11 by any convenient means, as by cap screws 49, the whole being separated from the head 11 by an insulating layer 50 of asbestos or the like. A rubber mat 51 is fixed to the under side of the plate 47 for periodic cooperation with the die members 29, 38 previously described in the normal molding or forming procedure.

It will be apparent from the foregoing description that the rubber mat 51 comprises the upper part of a forming die according to the invention, the lower part of the forming die being of composite construction and including the apertured, or peripheral, member 38 and the cooperating member adapted to periodically nest therewith, i. e., the die-holding plate 26 and the slides 28 and dies 29 carried thereby.

The operation of the present apparatus will now be described as applied to the fabrication of license plates from plastic materials, although it will be understood that suitable sheet metal stock may be formed therein if desired. In the latter instance, of course, the heaters associated with the die members need not be operated since pressure alone is sufficient to cause the metal blank to conform permanently to the forming characters on the die members.

At the commencement of an operating cycle the press and its appurtenances are in the relative positions shown in Figs. 1 and 2, and, the heating elements 23 and 48 having heated the adjacent members to the desired temperature, the platen 18 is raised by means of the ram 19 to bring the die-holding plate 26 into supporting contact with the under side of the die member 38. In this operation the raised dies 29 collectively enter and close the aperture 40 of the die member 38, the dies 29 preferably being of such thickness that their embossed surfaces are brought substantially level with the embossed surface of the die member 38. Molding material sufficient for the requirements of the license plate to be fabricated is now placed into the die member 38, the molding material being in any desirable form, such as liquid or powdered resins with or without fillers or reinforcing agents, or precut blanks in sheet form of rubber-like materials or of resin impregnated fibrous glass, or the like. The platen 18 is now caused to rise further, thereby lifting the die member 38 from its supporting pins 37 and carrying the nested die members 29, 38 into assembled molding relation, under pressure, with the rubber mat 51. Such pressure is maintained until the molded material has cured. During this pressing operation, surplus molding material extending over the trimming edge 42 is cut off by the pressure of the rubber mat on the trimming edge and is collected in the overflow well 43 from which it is removed at the end of the molding cycle. After the molded material has cured, the ram 19 is fully retracted, lowering the platen 18 to its initial position and leaving the die member 38 again freely supported on the pins 37. The molded license plate is then removed from the die member 38 and, after the desired change is made in the character dies 29, through substitution or rearrangement of the slides 28, the apparatus is in readiness to commense another molding cycle.

We claim:

1. Material-forming apparatus comprising a forming die including a pair of mating die parts relatively movable into and out of forming engagement, one of said parts being of composite construction and including a peripheral member having an aperture therethrough and a separable cooperating member, said members being relatively movable between an assembled position wherein said cooperating member closes said aperture and a disassembled position wherein said cooperating member is removed from said aperture, said cooperating member being provided with guides for the reception of removable and interchangeable slides carrying character-forming indicia, a press for said forming die including opposed, separated pressure elements relatively movable toward and away from each other between a compression position and a fully retracted position, a support fixed with respect to one of said elements and slidable with respect to the other in a direction parallel to the direction of relative movement of said elements and freely supporting said peripheral member in spaced relation between said elements when the latter are in said retracted position, said cooperating member being secured to one of said elements, the other of said die parts being secured to the other of said elements in operative alignment with said peripheral member, whereby said members are brought into assembled position and said assembled members brought into forming engagement with said other die part when said elements are moved from said retracted position to said compression position.

2. In forming apparatus including a press having a head and a platen relatively movable vertically toward and away from each other, the improvement which comprises a forming die composed of a pair of mating die parts, one of which parts is of composite construction and includes a peripheral member having an aperture therethrough and a separable cooperating member, fixed supporting means for said peripheral member, said supporting means being located between said head and said platen when said platen is in a fully retracted position with regard to said head, said peripheral member being freely supported thereby below and spaced from said head and above and spaced from said platen when the latter is fully retracted from said head and being adapted to be carried upwardly by said platen when the latter is raised a predetermined distance toward said head, said cooperating member being mounted on said platen and being spaced below said peripheral member when said platen is in said fully retracted position, said cooperating member including a plurality of grooved portions adapted to retain individually removable character-forming indicia collectively aligned with said aperture to enter the same when said platen is raised into supporting contact with said peripheral member, whereupon the respective members of the composite die part cooperate with one another, and adapted to be removed and interchanged when said platen is in said fully retracted position.

3. In forming apparatus including a press having a head, a base and a platen reciprocable vertically between said head and base, the improvement which comprises a plurality of vertical pins extending through said platen and fixed to said base, a die member supported on said pins above said platen when the latter is fully retracted from said head and adapted to be carried upwardly off said pins by said platen when the latter is moved a predetermined distance toward said head, said die member having an aperture therethrough, a die-holding member mounted on said platen below said die member, said die-holding member being provided with a plurality of keyways, and slides in said keyways carrying indicia-forming dies, said indicia-forming dies being collectively aligned with said aperture and adapted to enter and close the same when said platen is raised to bring said die-holding member into supporting contact with said first mentioned die member, said slides being interchangeable and removable from said die-holding member when said platen is fully retracted from said head.

4. In forming apparatus including a press having a head, a base and a platen movable vertically between said base and said head, the improvement which comprises a die member carried by the head, a plurality of vertical pins fixed to said base and passing freely through said platen, and a composite die member having a peripheral portion resting on said pins above said platen when the latter is fully retracted from said head, said peripheral portion having an aperture therethrough, and a cooperating portion mounted on and movable with said platen and adapted to nest with said peripheral portion upon initial upward movement of said platen toward said head, said cooperating portion being adapted to engage with said peripheral portion in the further movement of the platen toward the head, to lift the peripheral portion from said pins and move the composite die member as a unit into assembled relation with the die member carried by the head.

5. In fabrication of a series of objects of like outline having at least one surface impression in common but distinguishable from one another by at least one differing surface impression, the improvement comprising resting an apertured die member freely on top of a fixed support below an upper die and above a die-holding member adapted to hold therein a plurality of interchangeable character-forming dies individually in horizontal alignment with one another and collectively in vertical alignment with the aperture in the die member, placing a plurality of character-forming dies in the die-holding member in individual horizontal alignment with one another and collective vertical alignment with the apertured die member, inserting material to be die-impressed between the upper die and the character-forming dies and die member, raising the die-holding member and thereby nesting the dies in the apertured die member, raising the die-holding member further and thereby raising the apertured die member and the dies while in nested relation to compress the material against the upper die, and then retracting the die-holding member to restore the apertured die member to its rest position and to withdraw the die-holding member with the contained dies from the apertured die member, thereby releasing the impressed material.

6. In manufacture of a series of license plates characterized by uniform outline and partly uniform surface impression but having serially distinguishing surface characters impressed thereon, the improvement comprising locating a plurality of character-forming dies of like outline parallel to one another in perpendicular alignment with, but spaced from, a peripheral die member adapted to fit closely about the group of character-forming dies, nesting the group of character-forming dies in the peripheral die member, pressing a blank of material formable into a license plate between a resilient die and the nested group of dies and peripheral die member, releasing the impressed blank, releasing the group of dies from nested relation with the peripheral die member, and changing at least one character-forming die, whereupon the process is ready for another impression cycle.

7. In molding apparatus having a pair of compression faces relatively reciprocable into and out of mutual juxtaposition and an intervening die supported by one of the faces, the improvement comprising a peripheral die adapted to fit snugly around the intervening die and normally located between and spaced from the intervening die and the other compression face, a plurality of supports upon which the peripheral die normally rests and from which it is removable upon nesting engagement with the intervening die at the instance of relative movement of the compression faces into mutual juxtaposition and to which it is adapted to return upon separation of the compression faces, and means adapted to move the compression face supporting the intervening die into nesting engagement with the peripheral die and into juxtaposition with the other compression face.

8. Molding apparatus for thermally sensitive plastics comprising a pair of compression members located vertically opposite and parallel to one another, the compression face of one of said members being resilient and temporarily deformable under compression and the opposing compression face of the other of said members being substantially rigid under compression, at least the lower of said members being mounted for reciprocation toward and away from the upper member and each of said members having internal heating means in thermal contact with the compression face thereof, press means for raising the lower of the compression members and juxtaposing the respective compression faces, the rigid compression face being supplied with keyways located adjacent one another and adapted to receive a group of indicia-bearing dies, a peripheral die plate adapted to fit snugly around the group of indicia-bearing dies, supports located at a fixed level and underyling the peripheral die plate, the supports being adapted to support the peripheral die plate removably thereon, the peripheral die plate when resting on the supports being sufficiently distant from the rigid compression face to clear the indicia-bearing dies and being located to receive the group of indicia-bearing dies at the instance of contact with the lower compression face upon the raising thereof, both the enclosing peripheral die and the enclosed indicia-bearing dies being adapted upon relative movement of the respective composing compression faces into juxtaposition to hot-mold a sheet of plastic previoulsy inserted between them and the resilient compression face.

References Cited in the file of this patent

UNITED STATES PATENTS

| | | |
|---|---|---|
| 297,856 | Schmitz | Apr. 29, 1884 |
| 463,991 | Jackson et al. | Nov. 24, 1891 |
| 1,149,694 | Sonneborn | Aug. 10, 1915 |
| 1,519,005 | Pannier | Dec. 9, 1924 |
| 1,862,091 | Kaplan | June 7, 1932 |
| 1,987,370 | Pleger | Jan. 8, 1935 |
| 2,093,099 | Rosenberg | Sept. 14, 1937 |
| 2,160,427 | Bowie | May 30, 1939 |
| 2,164,452 | Freeman | July 4, 1939 |
| 2,278,542 | Freeman | Apr. 7, 1942 |
| 2,279,131 | Buckey | Apr. 7, 1942 |
| 2,422,883 | Bruderlin | June 24, 1947 |

FOREIGN PATENTS

| | | |
|---|---|---|
| 456,197 | Italy | Mar. 24, 1950 |